US006011678A

United States Patent [19]

Devautour et al.

[11] Patent Number: 6,011,678

[45] Date of Patent: Jan. 4, 2000

[54] ELECTRICAL DEVICE WITH DOUBLE AC BREAKING CONTACTS

[75] Inventors: Joël Devautour, Saint German en Laye; Jean-Pierre Guery, Bezons; Jacques Olifant, Nanterre; Raymond Plumeret, Asnieres sur Seine, all of France

[73] Assignee: Schneider Electric SA, Boulogne Billancourt, France

[21] Appl. No.: 09/057,444

[22] Filed: Apr. 9, 1998

[30] Foreign Application Priority Data

Apr. 16, 1997 [FR] France .................................. 97 04797

[51] Int. Cl.[7] ...................................................... H02H 3/00

[52] U.S. Cl. .................................................. 361/8; 361/13

[58] Field of Search .................................. 361/2, 3, 4, 5, 361/6, 7, 8, 9, 10, 11, 12, 13, 58

[56] References Cited

U.S. PATENT DOCUMENTS 3,475,574 10/1969 Stolar ....................................... 361/13

FOREIGN PATENT DOCUMENTS 1 532 433 7/1968 France ............................ H01H 9/30
2 476 379 8/1981 France ............................ H01H 9/30
27 30 726 1/1979 Germany ........................ H01H 9/40

*Primary Examiner*—Ronald W. Leja
*Attorney, Agent, or Firm*—Oblon, Spivak, McClelland, Maier & Neustadt, P.C.

[57] ABSTRACT

The device includes two breaking areas formed at each side of a contact bridge carrying main contacts that can be separated from fixed contacts located in the breaking areas and fixed to main conductors. The main conductors each have shaped extensions in the break areas that are configured to cooperate with shaped extensions associated with arc collection parts positioned nearby. The shaping of the extensions and the spacing therebetween encourage a particular direction of arc migration relative to arcs created when the moveable contacts carried by the contact bridge are separated from the fixed contacts. Further, arc migration control is provided in the form of magnetic fields provided in each breaking area. Each arc collection part is connected through a shunt conductor and a single direction of current flow establishing component to make a direct electrical connection to the main conductor associated with the other area.

5 Claims, 2 Drawing Sheets

ELECTRICAL DEVICE WITH DOUBLE AC BREAKING CONTACTS

This invention relates to an electrical device with separable double AC breaking contacts, comprising at least one pole path equipped with two fixed contacts and a mobile contact bridge, the contact bridge being fitted with mobile contacts working in cooperation with the fixed contacts and being movable from an open position to a closed position and vice versa to establish and interrupt the pole path.

When electrical devices of this type are used to switch high energies and/or to make a large number of switching cycles, breaking arcs apply severe conditions to contacts, and therefore cause premature wear. It is desirable to reduce breaking arcs applied to contacts, using means well known to the expert in the field.

One known way is to make shunted breaking devices in which each pole includes a main current path and a shunted current path laid out such that when a break occurs, the current is switched from the main path towards the shunted path to relieve the contacts and thus reduce their wear.

Document FR-1 532 433 in particular describes a simple breaking device in which the arc generated between the mobile contact and the fixed contact is transferred during opening to a fixed electrode in order to set up a shunted current path at each alternation, by means of a corresponding diode. But in this case breaking conditions are not uniform, since if the break occurs during one alternation, the bottom of an arc is transferred from the fixed contact to the fixed electrode, whereas if it occurs during the next alternation the bottom of the arc is transferred from the mobile contact to the fixed electrode. Furthermore, the arc transferred from the fixed contact during a first alternation remains too close to the fixed contact during the next alternation and there is a very high risk of the arc being restored or another flashover. If an attempt is made to avoid this problem by increasing the space between the fixed electrode and the contacts, breaking will be too slow unless the extinguishing means are oversized.

Document DE-30 05 877 describes a double breaking device with two pairs of fixed electrodes and a continuous magnetic field generator for each breaking area; the two electrodes adjacent to one mobile contact are interconnected to the two electrodes adjacent to the other mobile contact, through corresponding diodes. In this way, the current does not pass through the contacts whenever the arcs generated at each breaking point have been diverted to the corresponding electrode pairs by means of magnetic fields and the current break takes place the next time that the current drops to zero. This device has the disadvantage that it only works if there are two arcs; therefore the impedance of the shunted current path necessarily includes the impedance of each of the two arcs and the result is a high risk of another arc flashover in at least one of the breaking areas, which must be reduced using large extinguishing means.

Furthermore, it is known that it is easier to overcome a dielectric discontinuity by an anodic arc bottom than by a cathodic arc bottom. With this device, it is not easy to choose whether to use an anodic arc bottom rather than a cathodic arc bottom or vice versa in jumping the gap between the mobile contact and the adjacent shunting electrode, since it necessarily implies a jump from the anodic bottom to one of the breaking areas and a jump from the cathodic bottom to the other breaking area.

The purpose of the invention is to reduce the contacts in a device of the type described, giving priority to breaking speed and safety at the same time as making a special effort to significantly reduce the risk of another flashover by the use of very simple measures.

SUMMARY OF THE INVENTION

The invention relates to an electrical device with contacts that can be separated while carrying an AC current, comprising the following for at least one pole path.

at least one breaking area with fixed contact connected to a corresponding pole path connection terminal through a main conductor and a mobile contact cooperating with the fixed contact to make and break the pole path, a shunt path associated with each breaking area, that can be activated by a breaking arc and comprising a part collecting the arc placed at a short dielectric distance from the corresponding mobile contact, and a shunt conductor including a corresponding single directional electronic component.

The device according to the invention comprises two breaking areas and mobile contacts are placed on a contact bridge; the two arc collection parts are each connected to a main conductor opposite a corresponding shunt conductor and are laid out to collect a single arc bottom per alternation, so as to set up a single arc shunt path between the terminals when the break is made through a single directional component.

When the contacts separate, the electrical device considered benefits from a low impedance current path and a very low risk of the arc being restored.

It is useful if the main conductor is extended by an extension approximately parallel to the contact bridge, this extension being a short distance from the corresponding arc collection part.

Single directional components are placed either with their anode or their cathode connected to the corresponding arc collection part, as desired as a function of the required breaking conditions. Anodic switching is generally preferable, and consequently the cathode of each diode is connected to the arc collection part corresponding to the appropriate shunt conductor.

BRIEF DESCRIPTION OF THE DRAWINGS

The single directional components may be put in series with a current limiting device located on the shunt conductor.

DETAILED DESCRIPTION OF THE INVENTION

The following description is made of a nonrestrictive embodiment of the invention, with reference to the attached drawings.

Figure 1:
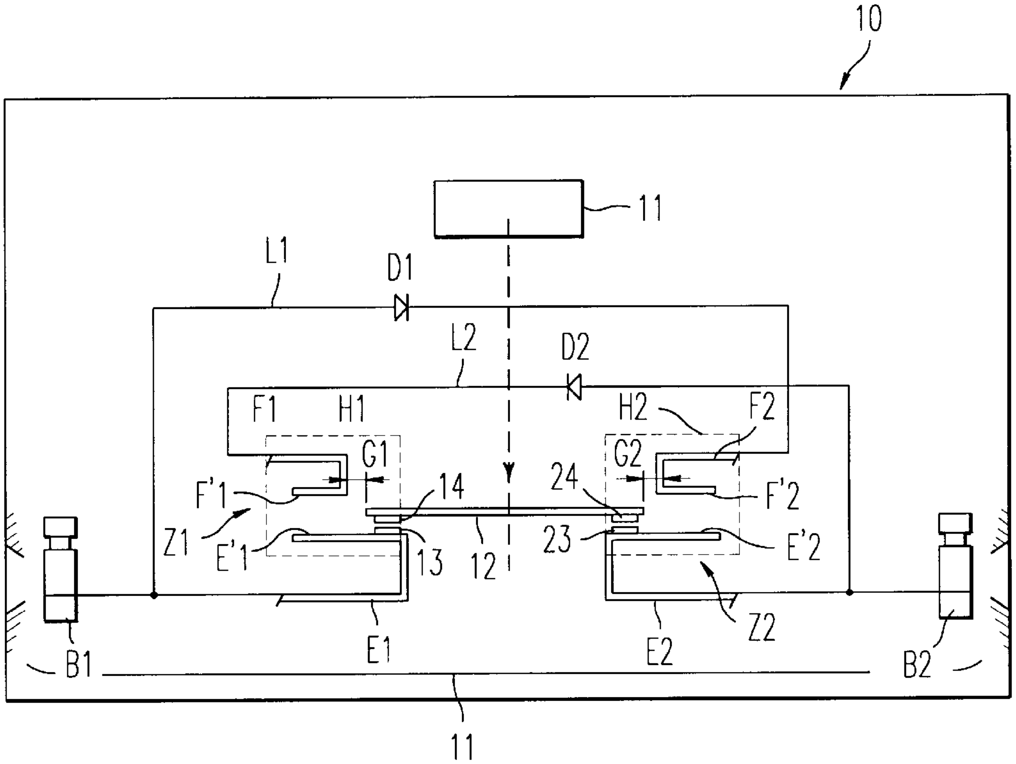

FIG. 1 schematically shows an electric device conform with the invention.

FIGS. 2 to 5 illustrate current circulation in the device during a break.

Figure 6:
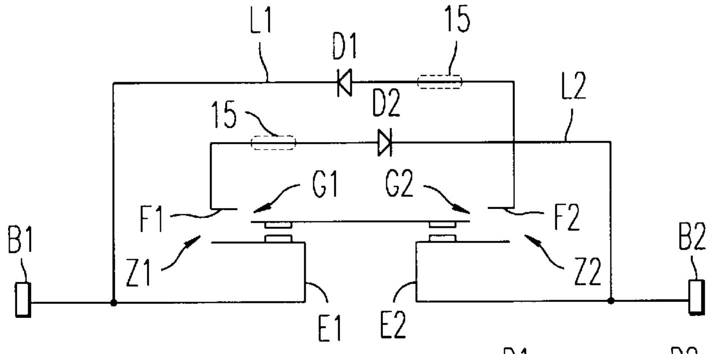
Figure 7:
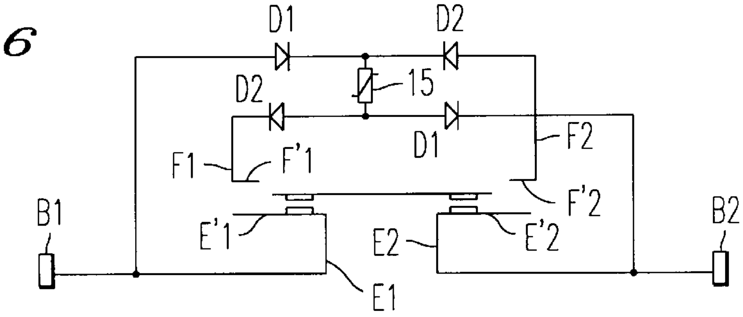
Figure 2:
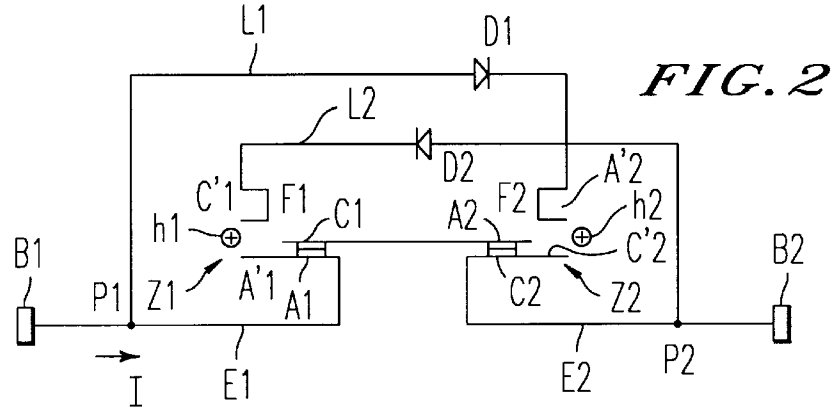

FIGS. 6 and 7 show alternative embodiments of the equipment.

The electrical device 10 shown in FIG. 1 is for example a contactor which comprises several double break pole paths 11 in a housing, in which the contacts are separable under the effect of a control device M. The pole path 11 comprises two fixed contacts 13, 23 connected to corresponding connection terminals B1, B2 through the main conductors E1, E2. A contact bridge 12 can be moved by device M and comprises two main contacts 14, 24 associated with fixed contacts 13, 23 respectively.

Two arc collection parts F1 and F2 are provided facing contact bridge 12 close to mobile contacts 14 and 24 respectively, so that they move away from the bridge in opposite directions. The collection part F1 is connected through a shunt conductor L2 to a point P2 on main conductor E2 located between the fixed contact 23 specific to it and the corresponding connection terminal B2. Similarly, the collection part F2 is connected through a shunt conductor L1 to a point P1 on main conductor E1 located between the fixed contact 13 specific to it and the corresponding connection terminal B1.

There is a single directional electronic component D2, D1 on each shunt conductor L2, L1, in order to conduct current between B1 and B2 in one of the two directions. Components D1, D2 are diodes; they may also be composed of semiconductor components that can be controlled when it is required to control their conducting window.

There are contacts and breaking areas Z1, Z2 close to contact pairs 13, 14 and 23, 24 including the actual contact area in which the arcs are created, and a breaking area or an extinguishing area towards which arcs are switched to be extinguished. A magnetic field generator H1, H2 is associated with each contact and breaking area Z1, Z2 to create an external magnetic field such that arcs originating in the two areas Z1, Z2 at the time of the break tend to be diverted. The field generators H1, H2 may be compact due to the breaking speed which is another result of the device according to the invention. For example, they may consist of a combination of a permanent magnet with a magnetic circuit. They are shown in dashed lines in FIG. 1 and their effect is represented by arrows h1, h2 in FIGS. 2 to 5.

Note that in areas Z1, Z2, elements in the path of arc bottoms are made in an appropriate manner. In the manufacturing form shown, the conductor E1, E2 is J-shaped which encourages migration of the arc and continues beyond contact 13, 23 by an extension E'1, E'2 such as a horn or a rail parallel to bridge 12. Similarly, the arc collection part F1, F2 has an extension F'1, F'2 such as a horn or a rail parallel to bridge 12 close to extension E'1, E'2 and offering an arc collection point close to mobile bridge 12, this point preferably being separated from the corresponding end of the bridge by a very short dielectric gap G1, G2. The shape of the part F1, F2 is appropriate, for example also J-shaped, to encourage migration of the arc and prevent another flashover. Although the device according to the invention can reduce or even eliminate arc extinguishing structures, extensions E', F' may be provided on the ribs of this type of structure.

The operation of the described device will now be explained with reference to FIGS. 2 to 5. The fixed contacts 13, 23 are now denoted A1, C2 and mobile contacts 14, 24 are denoted C1, A2 to draw attention to their anodic (A) or cathodic (C) nature. The same is true for extensions E'1, F'1 that are now denoted A'1, C'1 and for E'2, F'2 that are denoted C'2, A'2.

It is assumed that the contacts are initially closed (see FIG. 2) and that an AC current I circulates from B1 to B2 and vice versa.

Figure 3:
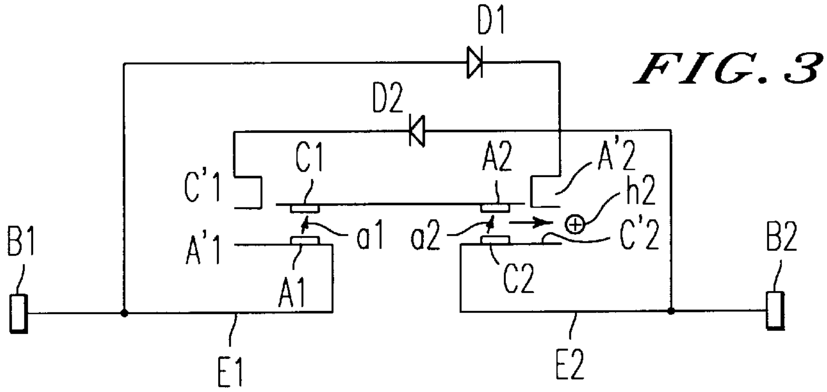
Figure 4:
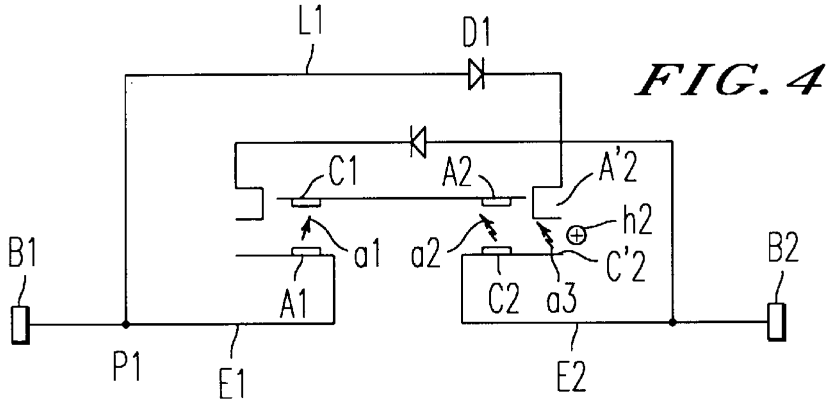
Figure 5:
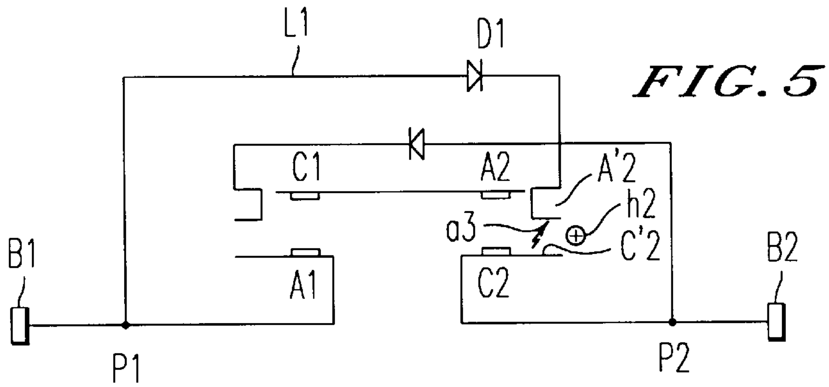

When the mobile bridge 12 opens and the current I circulates from B1 to B2, an arc a1 appears between contacts A1 and C1 and an arc $a_2$ appears between contacts A2 and C2 (see FIG. 3). The current continues to pass through the ma-in conductors E1, E2, whereas the arcs a1 and $a_2$ tend to be diverted towards the right by magnetic fields H1, H2 (FIG. 3). The choice made of the polarity of diode D1 in combination with the anodic crossing mode from gap G2 between mobile contact A2 and extension A'2 of the collection part F2 facilitates switching of the arc $a_2$. When $a_2$ passes across interval G2, an arc $a_3$ appears between A'2, C'2 (see FIG. 4). The current then passes between B1 and B2 firstly in the shunt conductor L1 through diode D1 and arc $a_3$ and then the main conductor E2, and secondly briefly continues to pass through the main conductor E1, arc $a_1$, bridge 12, arc $a_2$ and the main conductor E2.

Due the higher impedance of the main current path, arcs $a_1$ and $a_2$ are extinguished and the entire current then passes along arc $a_3$ (FIG. 5) and then extinguishes the next time the current passes through zero. Stagnation of arcs $a_1$ and $a_2$ on the contacts is thus minimized. It will be observed that the preferred jump of one of the arcs to its collection part is encouraged by intrinsic extinction to the shapes and layouts of the conducting parts and the auxiliary extinction generated by the magnetic field generator H1, H2; this preferred jump is also encouraged by anodic and cathodic differentiation of arc bottoms associated with the two sides of the bridge and by the difference in the arc migration direction due to the magnetic fields, and ensures that only part arc impedance is present in the branch circuit which makes switching faster and minimizes the risk of another flashover.

Operation is the same for the opposite current alternation, which passes from B2 to B1 by means of diode D2; diodes D1, D2 can also be installed as shown in FIG. 6, the arc switching through its cathodic bottom from mobile contact 14 to collection part F1. The device described as a contactor can also be a circuit breaker. In one application of the device as a circuit breaker, a current limiting device 15 may advantageously by provided on the shunt conductor L1, L2 (see dashed lines in FIG. 6). As an alternative (see FIG. 7), it is also possible to provide two diodes on each shunt conductor L1, L2 in order to form a diode bridge, by associating a single limiting device 15 in the diagonal of this diode bridge.

What is claimed is:

1. An electrical device comprising:

a contact bridge having two opposite ends, each of said opposite ends carrying a main contact that is positioned in a corresponding oppositely located breaking area;

a movement device configured to move the contact bridge when the movement device is engaged;

a pair of fixed contacts, each of said fixed contacts being fixed to a portion of an oppositely located main conductor, each said portion being positioned in an oppositely located breaking area, the main contacts being engaged with the fixed contacts when the movement device is not engaged and separated from the fixed contacts when the movement device is engaged;

a pair of connection terminals, each connection terminal being connected with a remote end of each oppositely located main conductor remote from a corresponding breaking area where the opposite end of the main conductor and said portion are located;

a pair of arc collection parts, each arc collection part being located in each breaking area and being configured to have an extension that extends next to a corresponding extension associated with the portion of the main conductor also located in that breaking area, each said extension being configured to encourage arc migration to each arc collection part when contact bridge movement initially separates the main contacts from the fixed contacts;

a pair of shunt conductors, each shunt conductor having one end directly connected to an arc collection part in one of the breaking areas and an opposite end directly connected to a point on the main conductor between the portion in the other breaking area and the remote end of that main conductor at the corresponding connection terminal; and a pair of single directional components, each one of the single directional components being in each one of the shunt conductors and being configured to provide a desired direction of current flow along that shunt conductor.

2. The device according to claim 1, wherein each main conductor extension extends approximately parallel to the contact bridge and each extension is at a short distance from the corresponding arc collection part and corresponding arc collection part extension.

3. The device according to claim 1, wherein each of the single directional components are placed with their anode or their cathode connected to the corresponding arc collection part depending on the required breaking speed.

4. The device according to claim 1, wherein each of the single directional components are connected in series with a current limiting device.

5. The device according to claim 1, further comprising a magnetic field generating device associated with each breaking area, each said magnetic field generating device being configured to generate a magnetic field oriented to help divert the arc in each breaking area to the collection part in each breaking area.

* * * * *